(12) United States Patent
Maschhoff et al.

(10) Patent No.: US 11,719,809 B1
(45) Date of Patent: *Aug. 8, 2023

(54) SYNTHETIC APERTURE INTERFEROMETRY IMPLEMENTATION METHOD

(71) Applicant: BAE SYSTEMS Information and Electronic Systems Integration Inc., Nashua, NH (US)

(72) Inventors: Kevin R. Maschhoff, Wakefield, MA (US); Martin F. Ryba, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/901,664

(22) Filed: Jun. 15, 2020

(51) Int. Cl.
*G01S 13/90* (2006.01)
*G01S 13/95* (2006.01)
*G01S 13/86* (2006.01)
*G01S 7/292* (2006.01)

(52) U.S. Cl.
CPC ............ *G01S 13/90* (2013.01); *G01S 13/867* (2013.01); *G01S 13/955* (2013.01); *G01S 7/292* (2013.01)

(58) Field of Classification Search
CPC ...... G01S 13/90; G01S 13/867; G01S 13/955; G01S 7/2929
See application file for complete search history.

(56) References Cited

U.S. PATENT DOCUMENTS

2014/0313072 A1* 10/2014 Soofi .................. G01S 15/88
342/25 A
2020/0124705 A1* 4/2020 Buonocore ......... G01S 13/0209

FOREIGN PATENT DOCUMENTS

EP 1065518 A2 * 1/2001 ............. G01S 13/87

OTHER PUBLICATIONS

Atlas et al., "The Measurement of Precipitation with Synthetic Aperture Radar", Journal of Atmospheric and Oceanic Technology, vol. 4, pp. 368-376, Nov. 21, 1986.

* cited by examiner

*Primary Examiner* — Marcus E Windrich
(74) *Attorney, Agent, or Firm* — KPIP Law, PLLC; Gary McFaline (57) ABSTRACT

The system and method represents a high-resolution, three-dimensional, multi-static precipitation RADAR approach that employs agile microsatellites, in formation and remotely coupled. This system and method uses multi-static RADAR interferometric methods implemented via a microsatellite formation to synthesize an effectively large (e.g., 15 m when using the Ku RF band) aperture to provide about 1 km horizontal resolution and about 125 m vertical resolution.

7 Claims, 10 Drawing Sheets

FIG. 8A collecting a plurality of cross-correlation interferograms in a cross-track dimension, formed by echoes from a precipitation field observed at each receiver when using range-resolving waveforms emitted from the at least one transmitting LEO satellite (112)

creating a 3D precipitation field using the aggregated 2D intensity images derived from the plurality of cross-correlation interferograms obtained when collecting radar echoes from a scene observed through diverse angles with spatial intensity variations in a third, or the along-track, dimension recoverable through tomographic processing (114)

SYNTHETIC APERTURE INTERFEROMETRY IMPLEMENTATION METHOD

STATEMENT OF GOVERNMENT INTEREST

This disclosure was made with United States Government support under Contract No. 80NSSC17K0466 awarded by NASA. The United States Government has certain rights in this disclosure.

FIELD OF THE DISCLOSURE

The present disclosure relates to weather-based radar methods and more particularly to utilizing a synthetic aperture interferometry implementation for increased cross-track resolution at lower cost and with a smaller form factors for the radar system.

BACKGROUND OF THE DISCLOSURE

Ground-based weather RADAR data are used more for weather monitoring rather than weather prediction. Specifically, these RADAR "see" where it is raining now. Sometimes, of course, where it is raining now may provide clues to where it will rain soon. Current systems show where it is raining, and most importantly, where a severe storm is present. Ground-based RADAR has sufficient spatial resolution needed to characterize the more challenging storms, including mid-latitude thunderstorms. However, a major weakness in ground-based weather RADAR is that these instruments are nearly all based on land, leaving the storms occurring over much of the earth's surface unobserved by these RADAR systems. These RADAR instruments are also very large.

Space-based precipitation RADAR would be capable of observing such storms anywhere on earth. However, current space-based precipitation RADAR systems are very large and expensive instruments. And yet, even with their large antennas, current space-based RADAR systems do not provide sufficient spatial resolution (~1 km) to characterize many of the most important storms, including mid-latitude thunderstorms, from space. Current systems also have a limited cross-track spatial coverage (which relates to area coverage). The cross-track coverage they do have still serves important science goals, by providing a sampling of storms globally, even though they only observe a small fraction of the storms that actually occur. To be useful for characterizing severe weather anywhere on earth, one needs either wider cross-track coverage from a few RADAR systems, or many such RADAR systems in space. Both of these options would be prohibitively expensive.

Weather situation awareness, especially for severe weather, is an essential aspect of modern life, for those planning and executing military missions, and for those charged with protecting the public through the use of severe weather warnings. In order to characterize and predict severe weather events, observation methods must be capable of observing the three-dimensional structure of the atmosphere, and its motion.

It is understood that current active and passive space-based systems lack the spatial resolution needed to characterize the atmosphere at storm-scale. Here, storm-scale is about 1 km horizontal resolution. Further, current space-based X-band synthetic aperture systems only provide two-dimensional imagery, which is influenced by precipitation. In fact, precipitation and surface backscatter signals are both present for a given range bin, thus making the precipitation effects hard to separate.

Active radio frequency (RF) remote sensing of dynamic scenes from low earth orbit are frequently challenged to have sufficient spatial resolution to meet application needs. Such situations arise when considering how to implement a space-based weather radar. But this need can be more general, and extend to any remote RF mapping problem where scene dynamics are involved. Traditional space-based real-aperture approaches are challenged by the diffraction limit. Higher spatial resolution requires ever larger antenna diameters, which drive observing satellite system size and cost. Traditional interferometric approaches such as SAR use the Doppler Effect, frequency shifts caused by line-of-site motion between scene and transmitter, to infer scene structure. But observations of the Doppler Effect cannot distinguish line-of-site motion effects due to transmitter-scene motion from those due to relative motions of objects within the scene. Current systems are also unable to distinguish relative motion between the observing platform and scene element from those due to motion within the scene itself.

Current space-based synthetic aperture systems perform two dimensional observations over a precipitation field at an oblique angle, mixing in surface backscatter with rain scattering. In contrast, the proposed method and system of the present disclosure provides for three-dimensional imagery, is capable of observing off-axis, and is at a much lower system cost than current methods. The system and method described herein is capable of finer (e.g., 1 km-scale) spatial resolution for precipitation, using frequencies included in (but not limited to) the Ku and X bands.

Wherefore it is an object of the present disclosure to overcome the above-mentioned shortcomings and drawbacks associated with the conventional remote sensing of dynamic scenes such as space-based weather radar.

SUMMARY OF THE DISCLOSURE

The present disclosure is an approach developed for a space-based 3D multi-static precipitation radar that employs agile micro-satellites operating synchronously in formation to provide 1 km horizontal spatial resolution observations of a precipitation field using a new interferometric method. Observations at this horizontal resolution are needed to resolve the fine thermodynamic phase structure present in many severe storms, and support the weather process research needed for future convection-resolving weather models. A focus of this work is on next-generation space-based precipitation field observations at finer spatial scales. The horizontal resolution of the current large GPM radar is 5 km-too coarse to resolve these phenomena. A real-aperture radar-scaled to provide 1 km resolution at Ku band would require an aperture dimension of 15-30 meters—a fundamentally unaffordable configuration.

Applicant's SToRM SAR (Satellite Tomography of Rain and Motion using Synthetic Aperture Radar), as described herein, directly leverages the rapid developments in small satellite technology and launch capability to provide significant new capability at a mission cost more than 10× lower than other space-borne precipitation radars—with the ability to penetrate and characterize severe mid-latitude storms at the 1-km scale from space for the first time.

Certain embodiments are compatible with both X-band and Ku-band operation, enabling full profiling through intense storms using transmitter power levels consistent with miniature solid state RF amplifiers. Suitable bands are those bands that provide adequate signal-to-noise ratios for the precipitation fields of interest. For example, it may be reasonable to one day employ this to study Jupiter's clouds. Given the different chemistry and other factors another RF band may be chosen. The approach employs range-encoded pulse sequences and strategically positioned receivers within a micro-satellite formation to enable a simultaneous interferometric measure of the vertical and cross-track structure of the precipitation field. The precipitation field is observed using a scene illumination approach similar that used for spotlight-mode employed on traditional 2D SAR systems. The suitability criteria for RF frequency are: that the scattering cross-section for precipitation is sufficiently large to yield backscatter that can be measured with transmitter power and that receiver sensitivity consistent with present technology, but not so large that the backscatter signal is attenuated below detection limits during its return path to the receivers. The back-scattering cross-section for precipitation particles is a strong function of frequency, with larger cross-sections observed for higher frequencies.

In certain embodiments of the present disclosure, the along-track precipitation field structure is recovered via a small-angular-range tomographic re-construction method. The duty-cycle of the observation is low, providing a regional observation followed by a reset/recharge period consistent with micro-satellite resource limits. Observation locations may be cued by passive IR and microwave mapping micro-satellites orbiting ahead, which indicate areas of immanent or ongoing severe weather. This method does not rely on the Doppler Effect for observing storm structure.

One aspect of the present disclosure is a synthetic aperture RADAR method comprising, providing at least one transmitting low earth orbit satellite; providing at least two receiving low earth orbit satellites; remotely coupling the at least one transmitting low earth orbit satellite with the at least two receiving low earth orbit satellites; flying the at least one transmitting low earth orbit satellite and the at least two receiving low earth orbit satellites in formation; synchronizing a timing of the at least one transmitting low earth orbit satellite and the at least two receiving low earth orbit satellites; collecting and resolving a plurality of two-dimensional intensity images via the at least two receiving low earth orbit satellites in an along-track dimension; operating the at least two receiving low earth orbit satellites in a spotlight synthetic aperture RADAR mode; aggregating the plurality of two-dimensional intensity images to increase a signal to noise; collecting a plurality of cross-correlation interferograms in a cross-track dimension, formed by echoes from a precipitation field observed at each receiver when using range-resolving waveforms emitted from the at least one transmitting low earth orbit satellite; and creating a three-dimensional precipitation field using the aggregated two-dimensional intensity images derived from the plurality of cross-correlation interferograms obtained when collecting radar echoes from a scene observed through diverse angles with spatial intensity variations in a third, or the along-track, dimension recoverable through tomographic processing.

One embodiment of the method is wherein the satellites are microsatellites, capable of agile, coordinated beam-steering.

Another embodiment of the method is wherein the satellites are operating in X-Band, Ku-band or other RF bands with suitable radar cross-section for precipitation. In some cases, mapping of the precipitation field reflectivity has a horizontal resolution of about 1 km and a vertical resolution of about 125 m.

Yet another embodiment of the method is wherein spotlight mode comprises a series of coherently linked echoes collected while lines-of-sight of the at least one transmitter and the at least two receivers rotates around a target area during which period the precipitation field is effectively stationary.

In some cases, one of the at least two receiving low earth satellites or the at least one transmitting low earth satellites is a master and the remaining at least two receiving low earth satellites or the at least one transmitting low earth satellites are slaves.

In certain embodiments of the method, the synchronization is within 5 ns at Ka band, and within a comparable number of RF waveform periods at other RF frequencies suitable for this application.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

In order to better understand the initiation of and the development of extreme weather events, the spatial and temporal resolution of measurements of atmospheric precipitation fields and their dynamics must be improved over current methods. These atmospheric observations are essential for the development of advanced cloud-permitting and cloud-resolving numerical weather models, and for improving the sub-scale parameterization of precipitation fields for current numerical weather prediction (NWP). Additionally, using these high spatial and temporal resolution regional observations, a system can be cued and targeted to areas of special interest by an earth-observing system of systems, and can play an important role in improving severe weather forecasts.

It is understood that improving resolution to convective scales on the order of 1 km will provide a significant improvement in characterizing the space time variability of precipitation processes. Ground-based precipitation RADAR observations also demonstrate the need for higher spatial resolution. Current methods show substantial heterogeneity of the precipitation field on the 5 km scale, which is greater than the size of the core of many mid-latitude thunderstorms. The size of current-generation, space-based precipitation RADAR footprints as well as their high spatial variability makes physical interpretation of current precipitation RADAR observations very difficult and challenging. Observing the field at 1 km horizontal resolution, as disclosed herein, will provide substantial benefits for physical interpretation and the understanding of precipitation field structure.

A critical enabling technology for the system and method described herein is Precision Timing Synchronization system for the various master clocks carried by the several, different spacecraft (e.g. satellites) that comprise the multi-static precipitation RADAR system. The multi-platform clock synchronization to the 5 nanosecond (ns) level is needed for this application. Currently, this is achievable for the relative time for the clocks on each spacecraft using the transmissions of the Global Positioning System.

The present disclosure represents a high-resolution, three-dimensional, multi-static space-based precipitation RADAR approach that employs microsatellites with agile beam steering, in formation and remotely coupled, via a high-precision, ultra-low power, remote timing synchronization technology. This system and method uses multi-static RADAR interferometric methods implemented via a microsatellite formation to provide the spatial resolving capabilities comparable to what would be provided by a large (e.g., 15 m-30 m) real-aperture radar in low earth orbit, to provide about 1 km horizontal resolution and about 125 m vertical resolution in the Ku-band. Under this radar approach, spatial resolving capability is provided along three largely orthogonal directions using approaches described herein. The method describes stacking a number of observations in a method similar to that used in spotlight-mode SAR; thus the beams must "dwell" on a region of interest and not merely sweep an area.

The required agility and coordination in beam-steering is that necessary to adjust the beam angles at a rate sufficient to maintain pointing at the selected target spot, while the spacecraft move in their orbits, and to do this in coordination with the transmitter and receiver satellites so their beams are all centered at that same location as they progress through their orbits. This is essentially Spotlight-Mode in action and existing space-borne SAR satellites currently accomplish this using electronically steerable beams implemented with phased-array antennas.

Precipitation field scene structure primarily in the vertical direction is resolved employing existing pulse-compression radar methods. More generally, precipitation field structure primarily in the vertical direction is resolved employing existing methods employing range-resolving transmitted waveforms. In this description of the present disclosure, these methods are said to employ range-encoded or range-resolving waveforms, because the design or choice of the modulation of the transmitted waveform over time bears a specific relationship to distance (or range) the portion of the waveform bearing this modulation has traveled from the transmitter since it was emitted. In the case of a pulse-compression radar, the frequency of the sinusoidal transmitted wave is modulated during the pulse period. An LFM waveform is one in which the sinusoid frequency varies linearly in time through the pulse period. More generally, amplitude or phase of the transmitted sinusoid as well as its frequency may be varied. In order to enable the capabilities for resolving spatial structure along other spatial axes than the range axis, the spatial structure resolving capability in the primarily vertical direction may require a larger pulse bandwidth (for pulse-compression), or finer range-resolving capability (in the more general case) than would otherwise be required to obtain the desired vertical structure resolving capability.

Under the present disclosure scene structure largely perpendicular to the transmitter and receiver lines of sight and largely perpendicular to the direction of satellite motion is obtained from cross-correlation of the echo signals received at points that are spatially separated in a direction perpendicular to the satellite direction of travel. Under certain conditions, the cross-correlation of these echoes encodes the relative cross-range position of the scattering centers in the scene. In some cases, such as a precipitation radar, a third axis of spatial information is needed.

Under the present disclosure scene structure largely perpendicular to the line of sight and largely parallel to the direction of satellite motion is obtained from a small-angle tomographic method, which uses the scene structure information gathered for the other two directions over a period of time during which the transmitting and receiving satellite lines-of-sight are maintained at a selected fixed point on the surface of the earth, while the satellite formation over-flies the surface fixed point. In this "spotlight mode" of motion, the angles of the transmitter and receiver lines of sight relative to the nadir direction vary as the spacecraft formation passes over the ground target point, changing the angle at which the observations described in the immediately preceding paragraphs are obtained. These observations can be collectively processed to form a set layer of two-dimensional layer projections largely perpendicular to transmitter and receiver lines-of-sight at each angular position. The set of such projections collected over the range of angles is then inverted using tomographic methods, applied over a small angular range.

Obtaining high horizontal resolution at frequencies appropriate for observing the precipitation field from space requires large effective apertures. For example, a 15 m aperture at the essential Ku band is needed for a 1 km horizontal resolution. Real-aperture RADAR with that size can certainly be built, but it would be exceptionally expensive. To provide a three-dimensional field at 1 km resolution, real-aperture RADAR needs to be a complex phased-array or an electronically scanned cross-track approach which adds additional complexity and cost. In contrast, the multistatic, coherent RADAR system of the present disclosure comprises a few miniature, low-cost space-craft to address this challenge in a cost-effective way.

Precipitation RADAR systems that are currently on-orbit are large instruments with kW scale power requirements. Especially when considering how one would increase the spatial resolution of these measurements in an affordable way, the severe power limitations of microsatellites needs to be considered. While no observation system can do everything well, one way forward is to constrain a high-resolution capability within a System of Systems context, as described herein, to observe selected targeted regions.

Figure 1:
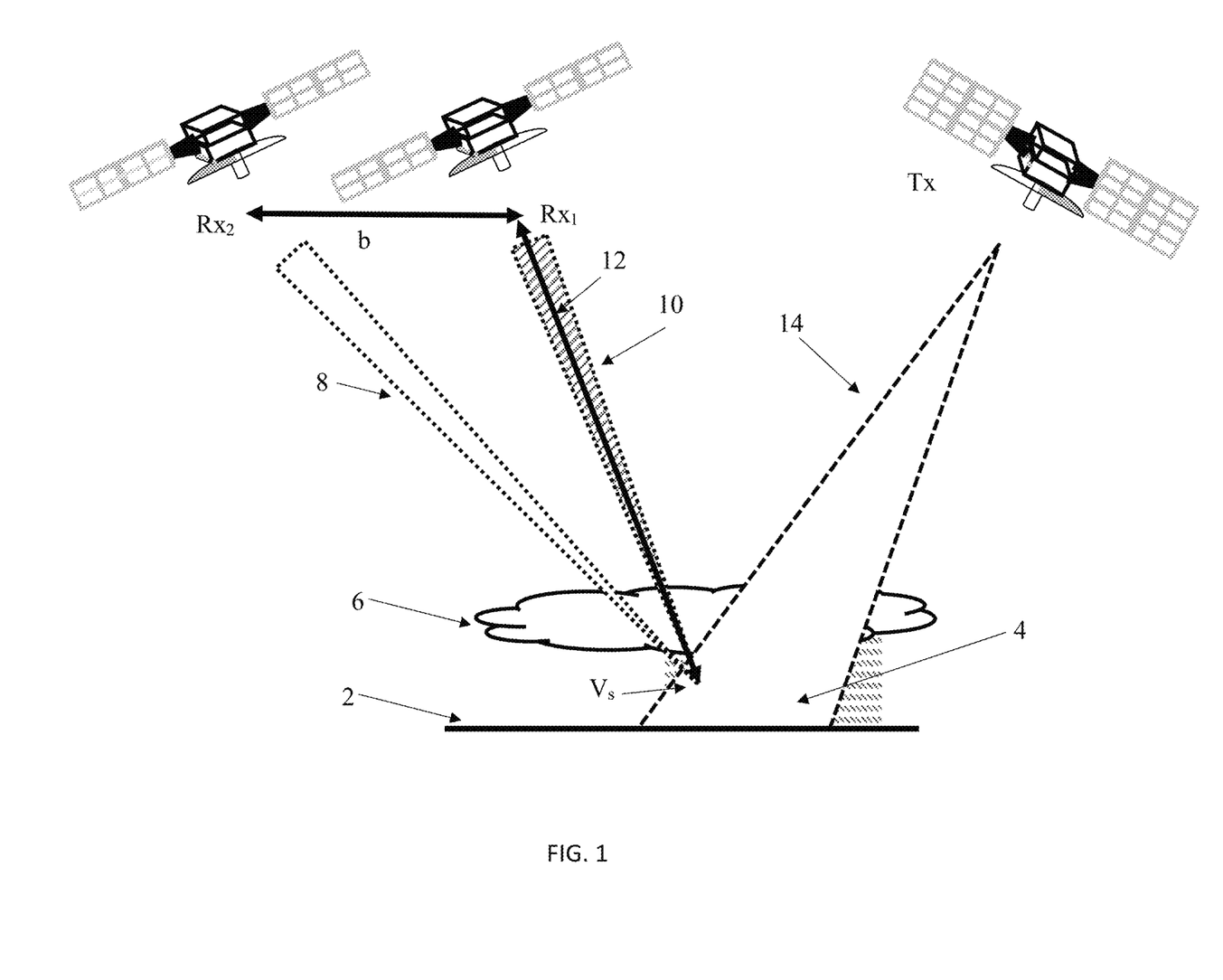
FIG. 1 is a diagram of a three microsatellite formation, demonstrating the observing geometry for the interferometric approach to resolve precipitation field horizontal structure according to the present disclosure.

Referring to FIG. 1, a diagram of a three microsatellite formation, demonstrating the observing geometry for the interferometric approach to resolve precipitation field horizontal structure is shown. In the figure, Tx indicates the transmitting satellite, $Rx_1$ and $Rx_2$ are receiver satellites, separated by a baseline distance, b. The Earth's surface 2, and the precipitation field 4 (e.g., rain, hail, snow, or mixed phase) that scatters a portion of the transmitted beam toward the receivers, is shown. A cloud 6, which does not impede RF transmitted or scattered signal, is also shown. Angular portions of the beam (8, 10) arising from the scatter of the transmitted beam by volume element, $V_s$, toward receivers $Rx_1$ and $Rx_2$ respectively. A range vector 12 from the scattering volume, $V_s$, and the first receiver, and the transmitted beam 14 are shown. There is a difference in the distance between the scattering volume and each of the two receivers.

Referring to FIG. 1, this shows one embodiment of a three micro-satellite formation designed to perform two types of interferometric observations according to the principles of the present disclosure. More specifically, a first and a second receiver ($Rx_1$, $Rx_2$) are shown with a transmitter (Tx). In certain embodiments, small, agile spacecraft are used as the transmitter and receivers to allow a body-steered transmit beam and multiple receive apertures to provide the "spotlight" mode observation of the present disclosure. As discussed herein, precise time synchronization between Tx and Rx is critical. In some embodiments, the synchronization is RF based and on the order 5 ns. The system RF links several satellites and determines their relative phases and locks them for use in interferometry. The receivers process a series of chirps (encoding the distance) via a phase sensitive reception technique.

Figure 2:
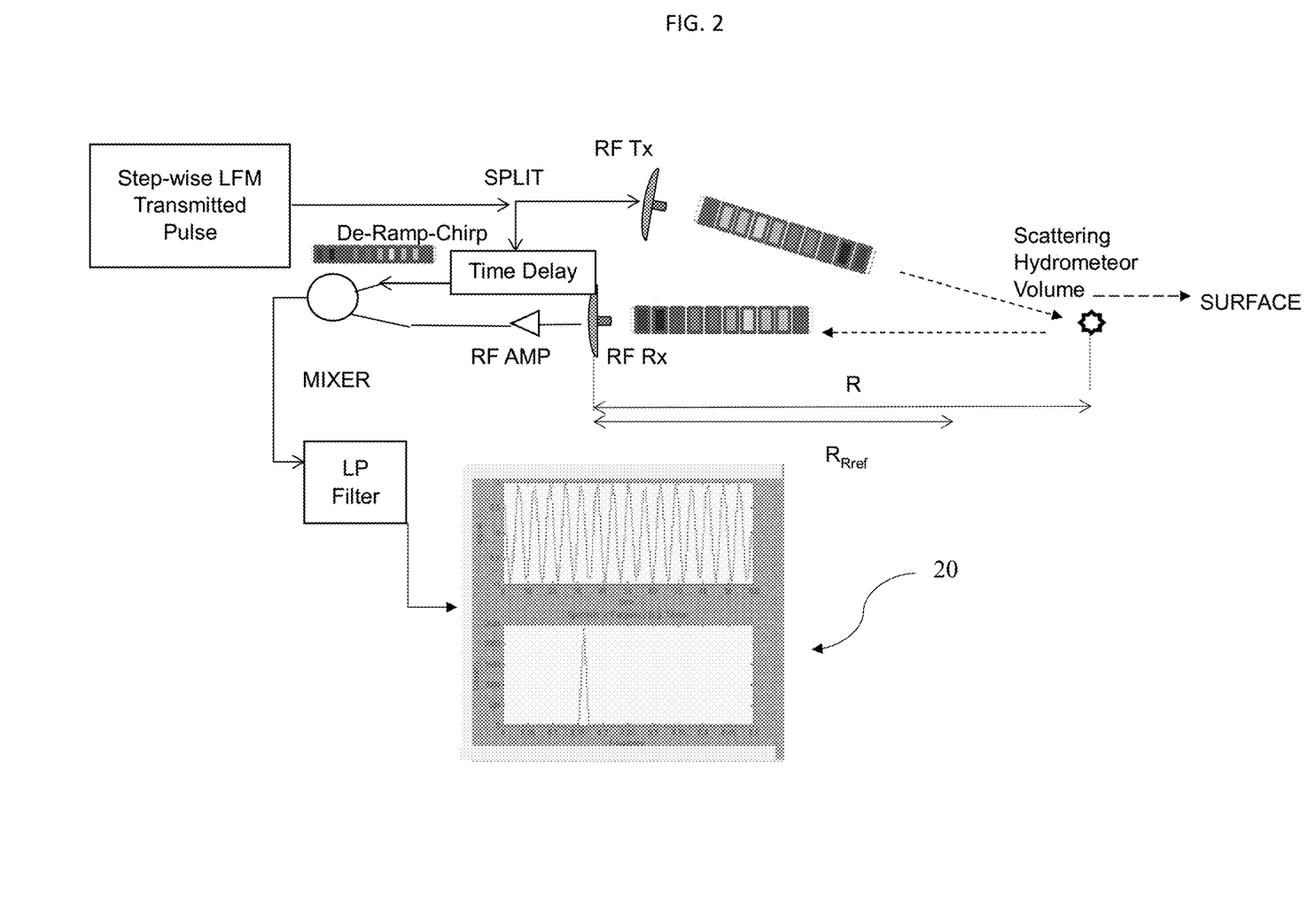
FIG. 2 is a diagram of a system according to Applicant's own work showing one depiction of conventional synthetic aperture radar (SAR) range processing using terms and a diagram that support a comparison of this standard processing method to the new interferometric method, as described in FIG. 3.
Figure 3:
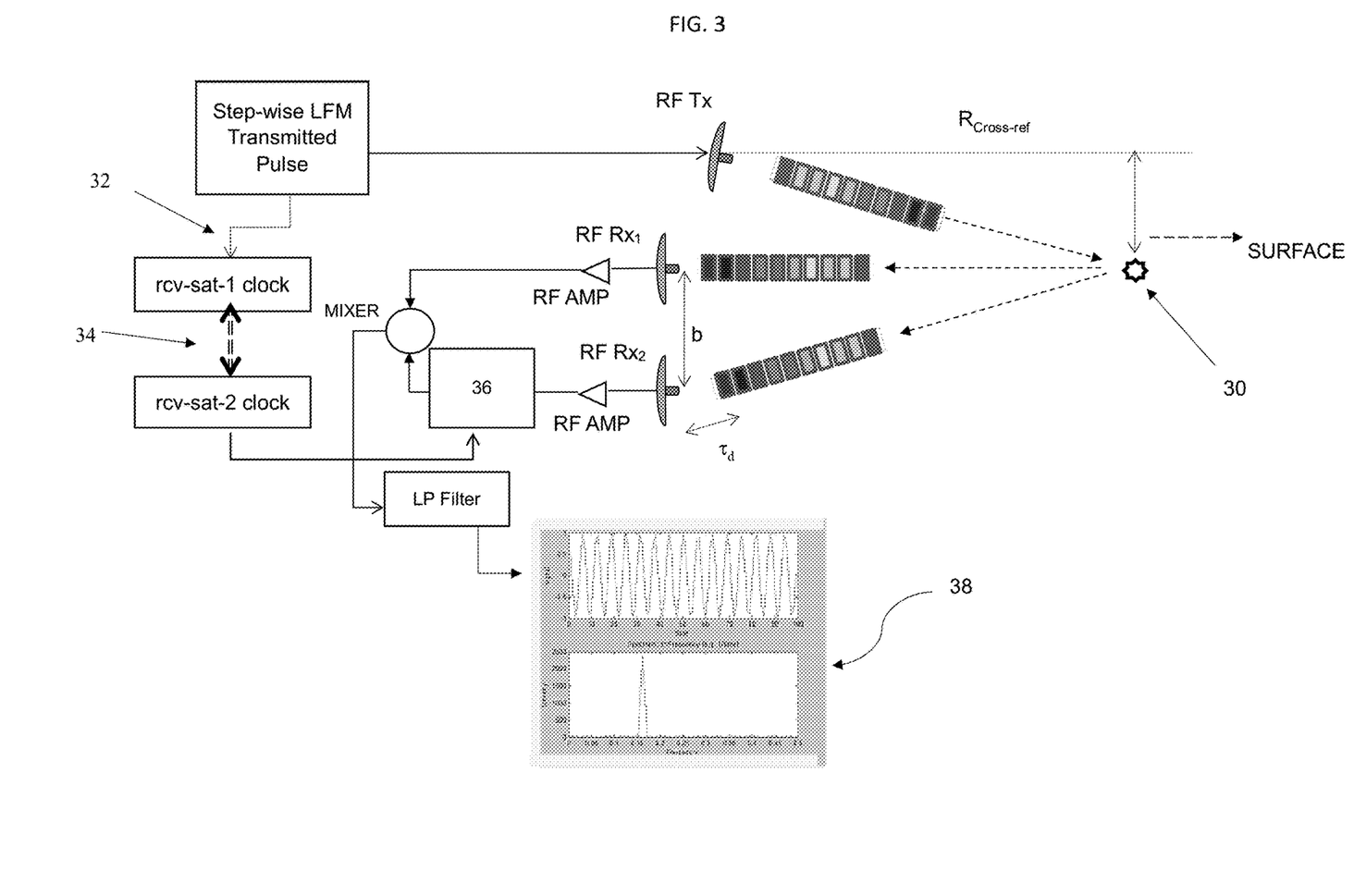
FIG. 3 is a diagram of one embodiment of a synthetic aperture radar (SAR) cross-range range processing system for a three microsatellite formation according to the principles of the present disclosure.

Referring to FIG. 2, a diagram of a system according to Applicant's own work showing one depiction of conventional synthetic aperture radar (SAR) range processing is shown, using terms and a diagram that support a comparison of this standard processing method to the new interferometric method, as described in FIG. 3. The figure shows a bi-static configuration, in which transmitter and receiver are spatially separated. In the figure, a transmitted wave is shown comprised of a series of bursts of RF energy, each at a specific frequency. In this example, the frequency of the individual bursts changes linearly with time through the pulse. This transmitted wave is shown scattered from a volume element of hydrometeors, such as raindrops, with a portion of that scattered toward a receiver. In conventional range processing, the received signal is amplified, and mixed with a time-delayed copy of the transmitted pulse. For a point scatterer, the low-pass filtered output of this mixing yields a (intermediate-frequency) signal, whose frequency is related both the range of the scatterer from the transmitter and receiver, and the time delay selected. For a point scatterer, an inverse Fourier transform of the mixed signal will yield an impulse function, whose relative position is a measure of the distance between the transmitter and the scatterer. Used in this way, the pulse encodes the range to the scattering elements in the scene. The pulse directly encodes distance using RF frequency and time. The mixing process subsequently encodes this range-to-transmitter information in frequency. There are number of different ways in which range information can be encoded into the waveform of the pulse. The principles of the present disclosure apply to many range-encoded waveforms.

As in FIG. 2, a transmitted wave is shown comprised of a series of bursts of RF energy, each at a specific frequency. This transmitted wave is shown scattered from a volume element of hydrometeors. However, in this case, a second receiver is added at a known distance, b, from the first. RF energy is scattered by the hydrometeor volume element toward each receiver. The scattered energy from a scatterer volume element arrives at the second receiver at a later time, with the time delay, $\tau_d$, given by the difference in the distance between each receiver and the scattering volume element divided by the speed of light. According to the principles of the present disclosure, the two receiver signals are mixed with each other (rather than one being mixed with a delayed copy of the transmitted pulse.) The low-pass filtered signal resulting from this signal mixing now produces output that encodes the difference between the distance from the scattering volume to the second receiver and the distance from the scattering volume to the first receiver. In this case, an inverse Fourier transform of the signal will yield a delta function, whose peak position is related to the difference in range. More generally, the correlated use of two receivers in this way together with a range-encoded transmitted pulse waveform provides a measure of the range difference. Under certain conditions described below within this disclosure (where the distances between the receivers is very small in comparison to the distance between the transmitter and receivers and the scattering field), this range difference will be directly related to (proportional to) the relative position of the scattering volume along an arc nearly perpendicular to the range axis, which is defined for use herein as cross-range position. The determination of range difference and cross-range position using range-encoded pulses requires a common time reference for the two receivers and the transmitter, as indicated in FIG. 3.

FIG. 3 is a depiction of cross-range processing. The cross-track spatial structure is extracted from cross-correlation of the range and is resolved via the observations from two or more receivers. Waves emitted by the transmitter, T, are scattered back to the receivers (in phase coherence with all of the receivers operating at a frequency of interest). In one example, the Ku-band is used and is about 10 GHz. The location of the earth's surface 2 and an intense precipitation field 4, are shown. A transmitted wave 14 is also shown, whereas 8 and 10 indicate the portions of the scattered wave directed toward receivers $Rx_1$ and $Rx_2$, respectively, from a portion of the backscattering precipitation field. The range vector 12 is from the backscattering field to the receiver-pair baseline vector, b. These multiple receivers fly "in formation" and are all aiming at the center of the storm 6, for example, and are said to be operating in "spotlight" mode.

Current satellite technology supports the placement of the receivers and transmitter into orbits with the cross-track separations needed to effect the multistatic observations described here. In a multi-static SAR system, precise common timing knowledge is essential for image reconstruction, and the precision-timing synchronization method attainable using the GPS system is sufficient to enable this observing concept. Separation of the Rx and Tx propulsion also allows for observations of rain back-scatter close to the ground and away from the sub-satellite track, which is key to obtaining a broad field of regard (FOR) while minimizing ground clutter interference.

For most space-borne SARs, the overall image field will be an aggregation of multiple (coherently collected, incoherently averaged) sub-fields. In some cases, fundamental coherent imaging sub-field size is about 5×20 km, step-stare collected over image field of regard (e.g. 10×240 km, 20×60 km), at 705 km orbit allowing access to imaging a region over 2 min, with a re-set of spacecraft formation for next composite field within about 20 s to about 500 s.

In some embodiments of the present disclosure, there are at least two receivers and at least one transmitter arrayed along a line. This configuration, coupled with forward motion of the formation in a direction perpendicular to the line is particularly useful in mapping a three-dimensional field of scatterers, such as scattering fields important at RF wavelengths. Such scatterers could include clouds, or fields of dust particles, or blowing sand, as well as fields of rain drops, snowflakes, hail, or sleet, which all have a three dimensional distribution of scattering centers. The appropriate RF wavelengths for observing different scattering species would be depend on the magnitude of the scattering cross-section for each species.

The signal depiction in FIG. 3 implies certain classes of transmit waveform such as Linear Frequency Modulation (LFM) that are well known in the RADAR and SAR community. Without loss of generality, the embodiment of the invention may as an alternative employ other more complex waveforms such as repeating sequences mixed with a low bandwidth LFM or optimized sequences and slightly modified "cross-correlation" processing replacing the simple mixer and filter shown in FIG. 3. The intended result is to provide cross range profiles analogous to that shown in (38) but with better resolution properties in terms of undesired mix products from multiple reflectors or nuisance signals such as ground clutter.

Referring to FIG. 3, a diagram of one embodiment of a synthetic aperture radar (SAR) cross-range processing system for a three microsatellite formation is shown. More specifically, according to the principles of the present disclosure cross-range position can be derived from correlated back-scatter of range-resolving signals with synchronized, separated receivers. Here, a step-wise linear frequency modulated (LFM) pulse, in the RF domain, is transmitted via a transmitter (RF Tx) and is reflected back from a scattering hydrometeor 30, (e.g., rain) that is located some distance above the surface of the earth. Each pulse compression, or burst, is represented by the colored bands. This back-scatter is received at two receivers (RF rcv-1 and RF rcv-2) and the pair of receivers are separated by a distance, b. The back-scattered signal is detected at the two receivers at different times due to the scatterer-receiver range differences. The two receivers each have an associated clock (rcv-set-1 clock, rcv-set-2 clock) which creates a coarser remote time synchronization 32 and a more precise remote time synchronization 34, such that the receiver signals are amplified and a time delay $\tau_d$ is computed via a time synchronization adjustment module 36. The combined signal is fed into a mixer and is passed through a low-pass (LP) filter such that intermediate frequencies (IF) can be determined, 38. The IF signal output from a scatterer at cross-range, $R_{cross}$, is a sign wave. $R_{cross}$ is the distance from the cross range to the scattering hydrometeor (e.g., cloud). The frequency of the IF signal output is approximately $R_{cross} - R_{cross-ref}$, where $R_{cross-ref}$ is the range to a reference surface and $-R_{cross-ref}$ is determined by de-ramp-chirp pulse timing delay.

Figure 4:
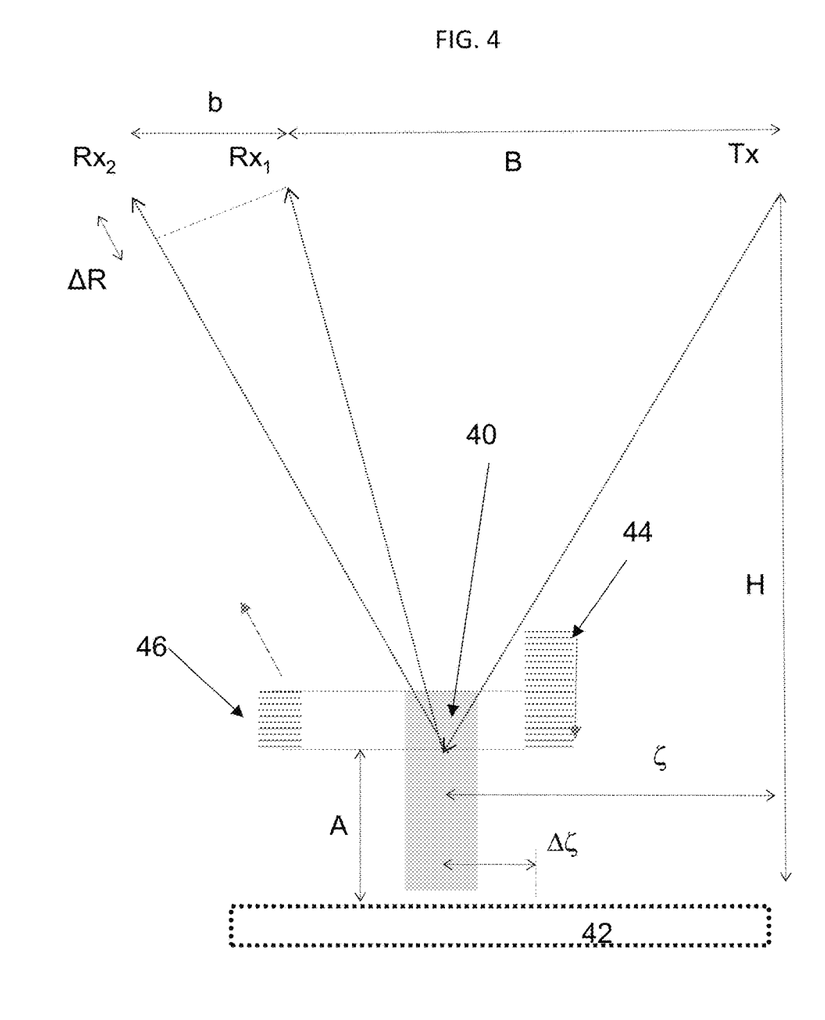
FIG. 4 is a diagrammatic view of one embodiment of a synthetic aperture radar (SAR) system for a three microsatellite formation according to the principles of the present disclosure.

Referring to FIG. 4, a diagrammatic view of one embodiment of a synthetic aperture radar (SAR) system for a three microsatellite formation according to the principles of the present disclosure is shown. More specifically, the diagram shows transmitter to reference receiver separation, B, and receiver ($Rcv_1$) to receiver ($Rcv_2$) separation, b, at an orbital height, H. The spacecraft velocity vectors are perpendicular to the plane of the page. The altitude A is shown above the observed field 40. In FIG. 4, (40) is one column of the precipitation field being observed, (42) is the Earth's surface, (44) represents a transmitted long pulse progressing downward through the field, (46) represents scattered RF energy emerging from those portions of the field that the RF pulse leading edge has passed through, ΔR is a difference in the distance from the scattering volume at the pulse leading edge to each of the two receivers, H is the orbital height of the satellite formation above the surface, is the horizontal distance from the transmitter sub-satellite point to the base of the column of the precipitation field, and is the horizontal distance from that same point to the mid-point between the $Rx_1$ and Tx sub-satellite points.

For nominal LEO orbital heights, the range difference (ΔR=$R_2$−$R_1$), of the distance between an observation field element and each of the receivers, varies linearly with cross-range position and is largely independent of altitude. It has the strongest dependence on receiver separation, b. The cross track position ζ relative to the transmitter and the cross track position relative to the transmitter-$Rcv_1$ specular point Δζ. For large R, ΔR is approximately constant.

$$\frac{d(\Delta R)}{d\zeta} = \frac{\Delta\zeta - (B/2 + b)}{R_2} - \frac{\Delta\zeta - (B/2)}{R_1}$$

$$\frac{d(\Delta R)}{d\zeta} \approx \frac{-b}{H}(1 + A/H)$$

$$\frac{d(\Delta R)}{db} = \frac{b - \Delta\zeta + (B/2)}{R_2}$$

$$\frac{d(\Delta R)}{db} \approx \frac{b - \Delta\zeta + (B/2)}{H}\left(1 - \left(\frac{(b - \Delta\zeta + (B/2))^2}{H^2}\right)\right)$$

Still referring to FIG. 4, the RF pulse 44 propagating down through the precipitation field 40 is shown. The precipitation field 40 is some distance above the earth's surface 42. The RF back scatter 46 from portions of the column of the precipitation filed where the RF pulse has reached is scattered back toward the receivers.

Figure 5A:
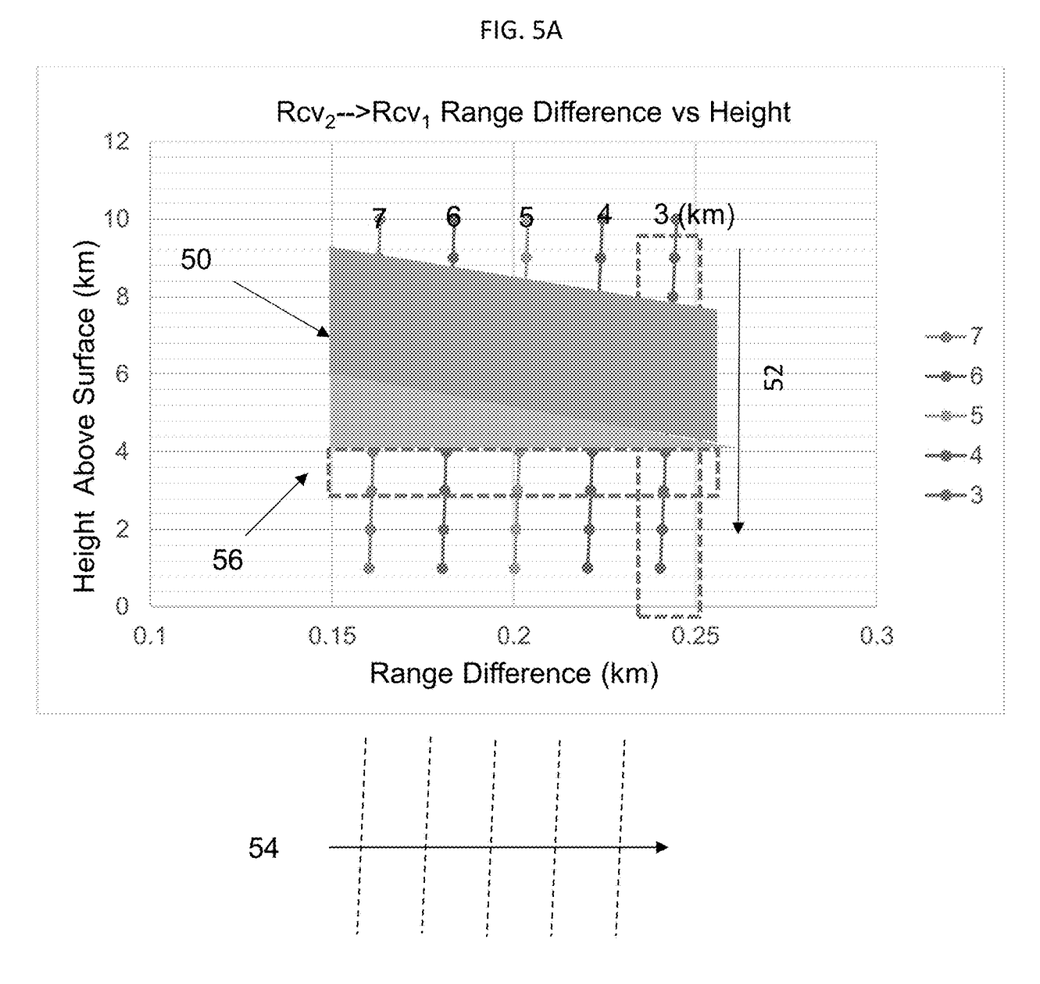
FIG. 5A is a plot of range difference between two receivers versus height for one embodiment of the system of the present disclosure.

Referring to FIG. 5A, a plot of range difference between two receivers ($Rcv_1$ and $Rcv_2$) versus height for one embodiment of the system of the present disclosure is shown. More specifically, one embodiment of the system had a 10 km-10 km-10 km $Rcv_2$-$Rcv_1$-Tx configuration at a 500 km orbit. The cross-correlation (product) of back-scattered reflections at the two receivers can provide cross-track spatial position information. Transmitted pulses are range-encoded (similar to SAR, GPS signals) e.g. as a stepwise LFM pulse train. Receiver-receiver cross-correlation signal sums all reflectivity products, where those at a common range-difference occur at one frequency. Under broad range of transmitter/receiver placements, "range" and "delta-range" are nearly independent variables and they can be used as quasi-orthogonal position vectors.

Still referring to FIG. 5A, the cross-range position in relation to the transmitter is shown as 3, 4, 5, 6, or 7 km in this example The portion of the pulse where both receivers are illuminated 50 is shaded, and range and time increasing down along the arrow (52). The cross-correlation difference frequency 54 is shown form left to right and an iso-range layer, for $Rcv_1$, 56 is also shown. Reflected signals arriving at each receiver from each scattering volume element in the field are sums of sinusoids, which are scaled and delayed copies of the transmitted pulse.

In some embodiments, cross-correlation between received signals are computed, with sinusoid products scaled by reflectivity, where the sinusoid product comprises the sum and difference frequencies. In certain embodiments, inverse Fourier transform is used to isolate cross-range cells as $c_k = \Sigma_j z_{j,k} \cdot (\Sigma_l z_{l,k}) \cdot e^{-2\pi i \Delta f_j t}$, where $c_k$ is cross-correlation at iso-range k, and $Z_{j,k}$ is amplitude reflectivity at cross-range position j and range position k. The cross-correlation signal accumulates as the pulse leading edge moves downward through the precipitation field. In some cases, $C_m = \Sigma_k c_k \cdot P_{m-k}$, where $C_m$ is a partial sum layer cross-correlation at each time step as the RF LFM pulse moves through precipitation field (See, e.g., FIG. 5B and FIG. 5C). $P_m$ is an indicator of pulse edge position relative to the precipitation field and the receivers. In certain embodiments, $P_m$ is equal to 1 where the scattered radiation reaches each receiver.

Figure 5B:
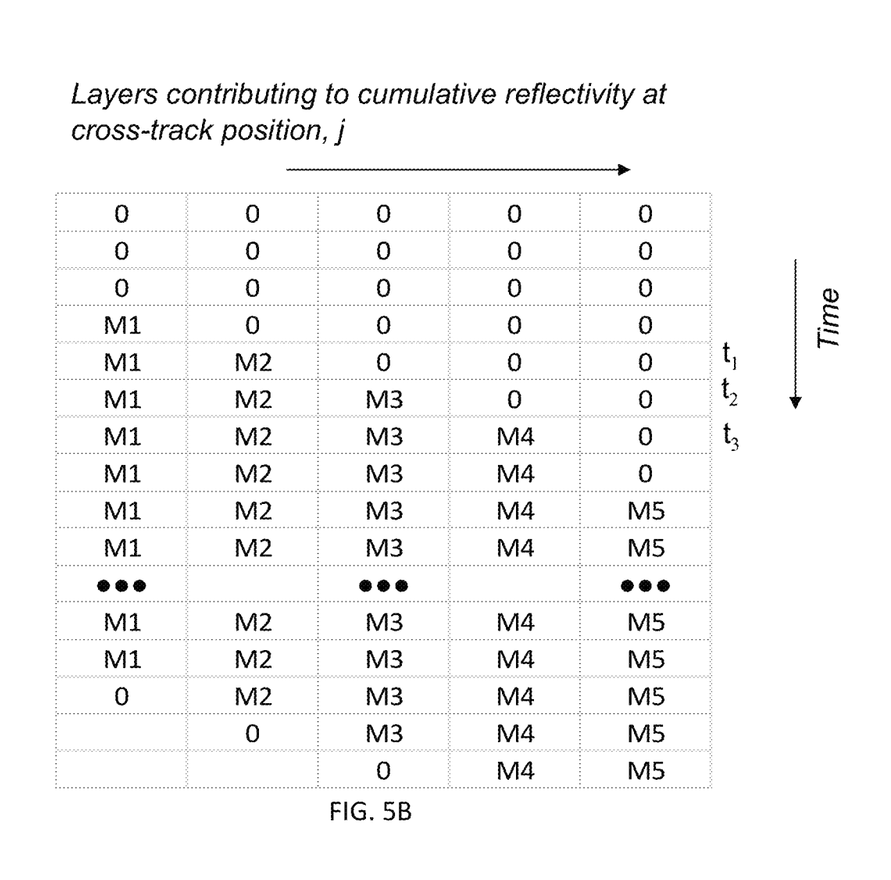
FIG. 5B shows a representative matrix for one embodiment of a synthetic aperture radar (SAR) cross-range range processing system according to the principles of the present disclosure.
Figure 5C:
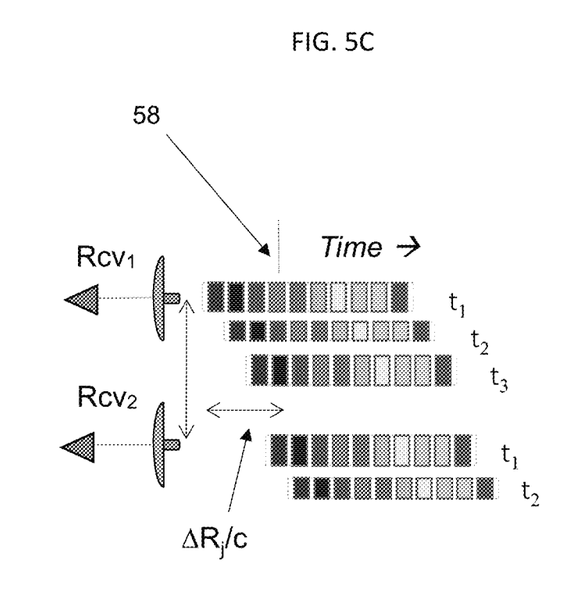
FIG. 5C is a diagram showing an echo front reaching a pair of receivers for one embodiment of a synthetic aperture radar (SAR) cross-range range processing system according to the principles of the present disclosure.

Referring to FIG. 5B, a representative matrix for one embodiment of a synthetic aperture radar (SAR) cross-range range processing system according to the principles of the present disclosure is shown. More specifically, a matrix used for data processing shows lower diagonal form for layers contributing to the cumulative reflectivity at cross track position j as time progresses ($t_1, t_2, t_3, \ldots$). For example, at time step 2 ($t_2$) M1, M2, and M3 are contributing. $M_{j,k} = a_0 \cdot z_{j,k} \cdot (\Sigma_l z_{l,k})$ Where M is the reflectivity at the $j^{th}$ position from inverting the Fourier transform $S_j = \Sigma_1^k M_{j,k}$. In certain cases, measurements are taken at different time steps during each pulse, at each cross-track position, and this yields a linear system of equations where one can solve for reflectivity versus height. Referring to FIG. 5C, a diagram showing an echo front reaching a pair of receivers for one embodiment of a synthetic aperture radar (SAR) cross-range range processing system according to the principles of the present disclosure is shown. More specifically, an echo front 58 is shown reaching both receivers, where each receiver is receiving back-scattered pulses at time steps 1, 2, 3, . . . .

Figure 6:
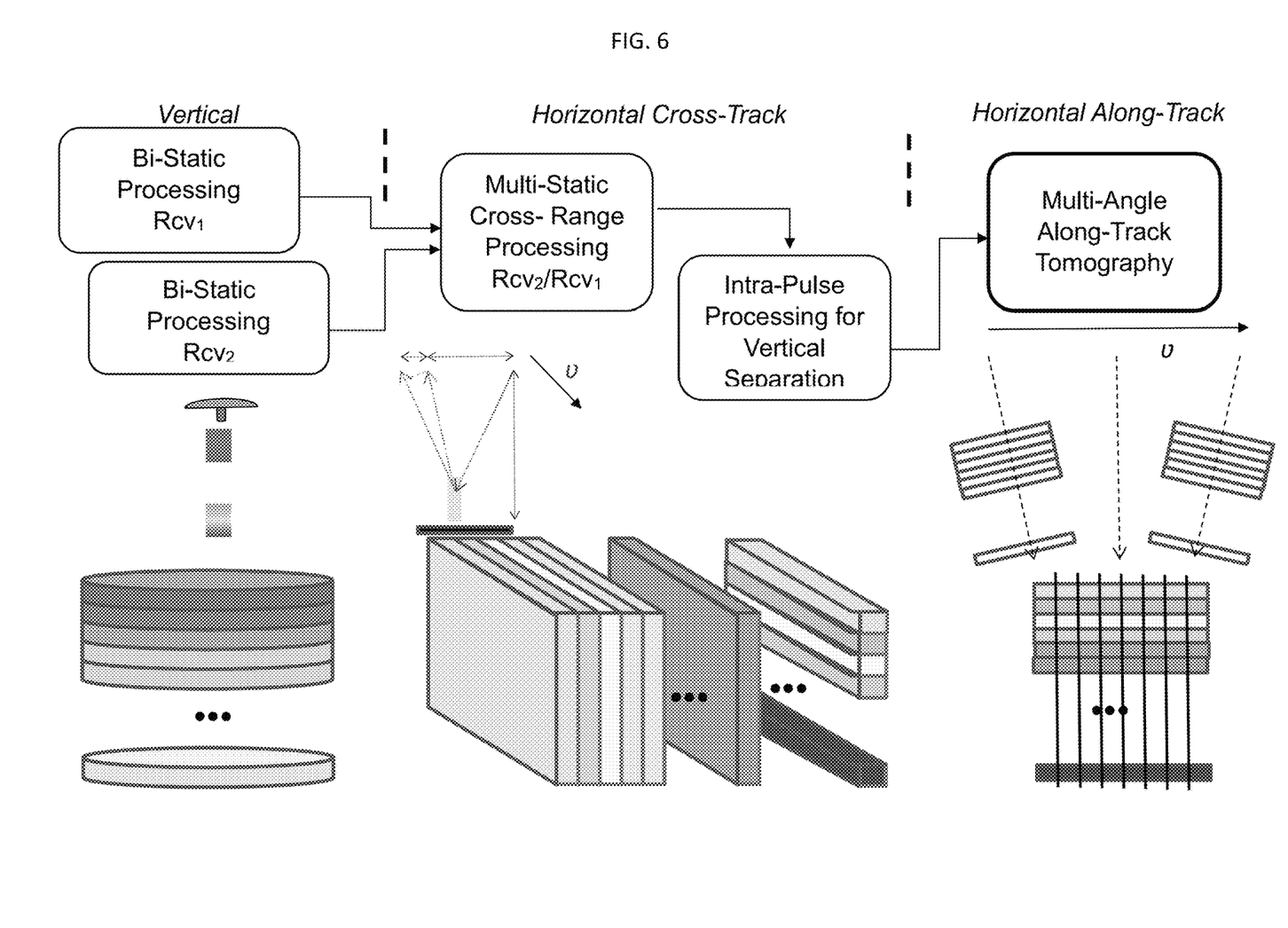
FIG. 6 is a diagrammatic representation and a flow chart showing vertical, horizontal cross-track, and horizontal along-track, respectively, from left to right according to the principles of the present disclosure.

Referring to FIG. 6, a diagrammatic representation and a flow chart showing vertical, horizontal cross-track, and horizontal along-track, respectively, from left to right according to the principles of the present disclosure is shown. More specifically, on the left of the figure vertical bi-static "stretch" processing for each receiver is conducted. In certain embodiments, vertical layer separation uses frequency chirp/(local oscillator) LO and inverse Fourier transform methods. Next, horizontal cross-track processing (shown in the center of the figure) is conducted. Multi-static cross-range processing for $Rcv_1$/$Rcv_2$ is done where the velocity (u) of the satellites (Tx and Rcvs) is shown coming out of the page. (See, e.g., FIG. 4). Cross-track layer separation uses frequency difference and Inverse Fourier Transform and the time-based separation for intra-pulse processing for vertical separation utilizes the matrix and inverse FT. See, e.g., FIG. 5B. Lastly, horizontal along-track processing utilizes the multi-angle (spotlight mode) along-track tomography. In certain embodiments, a spotlight-mode observation is where a transmitted beam tracks fixed point in scene during fly-over. In some cases, the range and cross-range methods extract 1) stratified structure vertically, and cross-track, and 2) line integrals along-track. The beam "rotates" around the scene, viewing at different angles, and allows imaging mode analogous to an x-ray cat scan. It provides line integrals over a range of angles. The satellites' velocity (u) is shown moving left to right. The stacks (of vertical processing) are turned on edge. As the satellites traverse across a field the angle changes and this stack is being rotated at a small angle. Looking at the area, a small angle tomographic reconstruction is possible. Here, the angle-based separation utilizes the matrix and inverse FT.

The mathematical processes involved for recovering the 3D image are as follows. The recovery of the vertical back-scattered reflectivity image (averaged over the transmitted beam is a Fourier Transform, following current long-pulse radar practices. The reflectivity as a function of distance along the transmit and receive paths is encoded I frequency by the method used for the observation, and the reflectivity vs (vertical) position is recovered via an inverse Fourier Transform. The mathematical process for recovering the reflectivity in the cross-track direction, (cumulatively in the vertical direction) is, once again an inverse Fourier transform. The result obtained at each cross-range is the cumulative result for the vertical column. A set of such cumulative results for a given vertical column forms a set of linear equations, which is inverted using standard methods to yield values that, collectively, form a 2D image of the reflectivity, where each point represents the projected sum of reflectivity in the perpendicular direction. The mathematical processes for obtaining the reflectivity along-track are, once again, inversions of linear systems of equations, collected at different angles in a way described in more detail in the following paragraph.

Figure 7A:
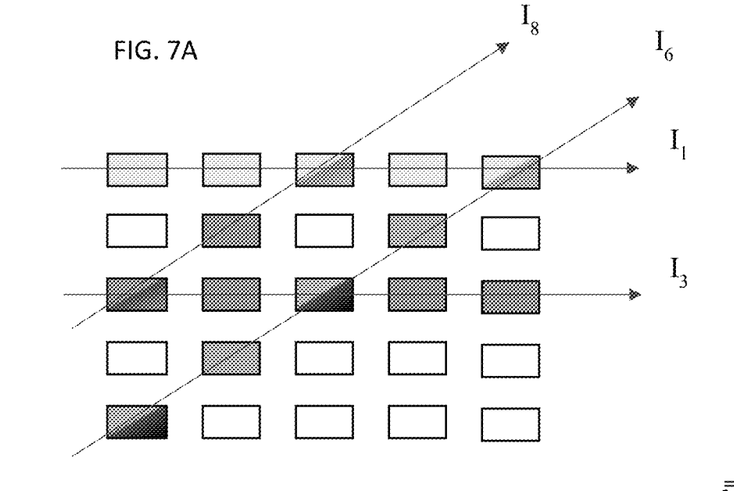
FIG. 7A is a diagram showing processing for one embodiment of a synthetic aperture radar (SAR) cross-range range processing system according to the principles of the present disclosure.
Figure 7B:
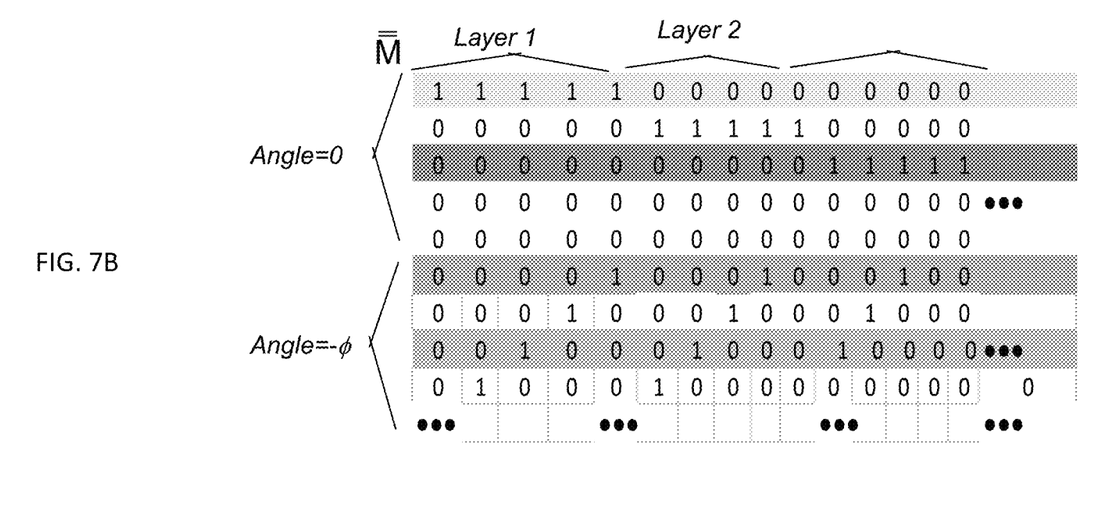
FIG. 7B is a diagram showing processing for the embodiment of a synthetic aperture radar (SAR) cross-range range processing system in FIG. 7A according to the principles of the present disclosure.

Referring to FIG. 7A, a diagram showing processing for one embodiment of a synthetic aperture radar (SAR) cross-range range processing system according to the principles of the present disclosure is shown. More specifically, for a five range-cell, five along-track cell filed for each cross-track layer (e.g., $I_1 = \mathscr{P} \cdot (z_{11} + z_{12} + z_{13} + z_{14} +_{15})$ Each layer, at each angle, yields a linear equation for a line integral of along-track reflectivities. Referring to FIG. 7B, a diagram showing processing for the embodiment of a synthetic aperture radar (SAR) cross-range range processing system in FIG. 7A according to the principles of the present disclosure is shown. More specifically, from observations at multiple angles, $\vec{I} = P\overline{M}\vec{z}$, then invert "M" to recover along-track reflectivity vs height for each cross-track layer $\vec{z} = \mathscr{P}^{-1}\overline{M}^{-1}\vec{I}$.

The process for obtaining reflectivity in the along-track direction is a process analogous to medical CAT scans. At each angle of the transmitter and receiver beams, relative to the target point on the earth, a 2-D image is collected. Each of these is represents the back-scatter response spatially resolved along a transmit-receive axis, and along the axis perpendicular to the orbital track (and the transmit-receive axis). The backscatter response is summed in the third axis. Such a 2D image is a projection. Such projection images at similar angles can be summed, to increase SNR. Projection images taken at many different angles can be collectively processed to yield a 3D image. In medical imaging—this processing takes the form of a Radon transform—where the x-ray projection images are taken in transmission and represent the attenuation a single-point x-ray source opposite the transmitter. X-ray source and receivers are moved around the object being imaged through a series of angles. A well-known mathematical procedure relates the set of projection images to the 3D image of the x-ray attenuation. In our present case, each point in one of the 2D projection images represents the sum of back-scattering from a set of volume elements arrayed in a row perpendicular to the 2D plane—and are said to form a line integral, I. In the present case, the spacecraft formation is moving about the storm through a series of angles. The required transformation to obtain the can be represented as a set of linear equations (line integrals), obtained from different angular projections that can be inverted to recover the 3D image. In the medical imaging case, the needed spatial resolution in the image is approximately the same in each of the three axes, so a wide range of angles is needed. However, for storms, the required vertical resolution is much finer than that needed in the horizontal directions—so a small range of angles is sufficient.

Figure 8A:
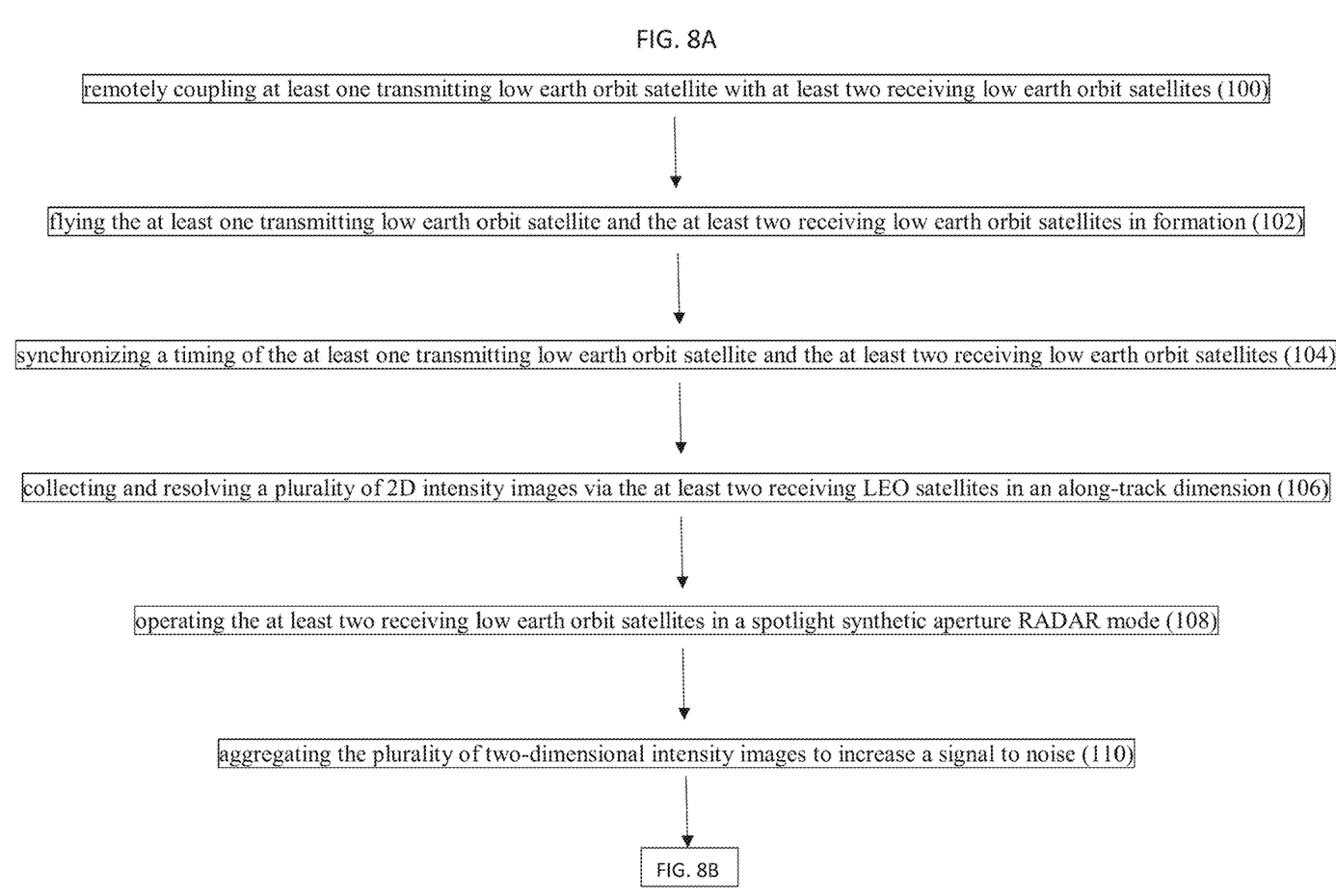
FIG. 8A and FIG. 8B is a flow chart of one embodiment of a method according to the principles of the present disclosure.

Referring to FIG. 8A, a flow chart of one embodiment of a method according to the principles of the present disclosure is shown. More specifically, at least one transmitting low earth orbit satellite and at least two receiving low earth orbit satellites are provided. The at least one transmitting low earth orbit satellite and the at least two receiving low earth orbit satellites are remotely coupled (100). The at least one transmitting low earth orbit satellite and the at least two receiving low earth orbit satellites are flown in formation (102). A timing of the at least one transmitting low earth orbit satellite and the at least two receiving low earth orbit satellites are synchronized (104) and a plurality of two-dimensional intensity images via the at least two receiving low earth orbit satellites in an along-track dimension are collected and resolved (106) via a correlation process as depicted in FIG. 3. The at least two receiving low earth orbit satellites are operated in a spotlight synthetic aperture RADAR mode (108) and the plurality of two-dimensional intensity images are aggregated to increase a signal to noise (110).

Figure 8B:
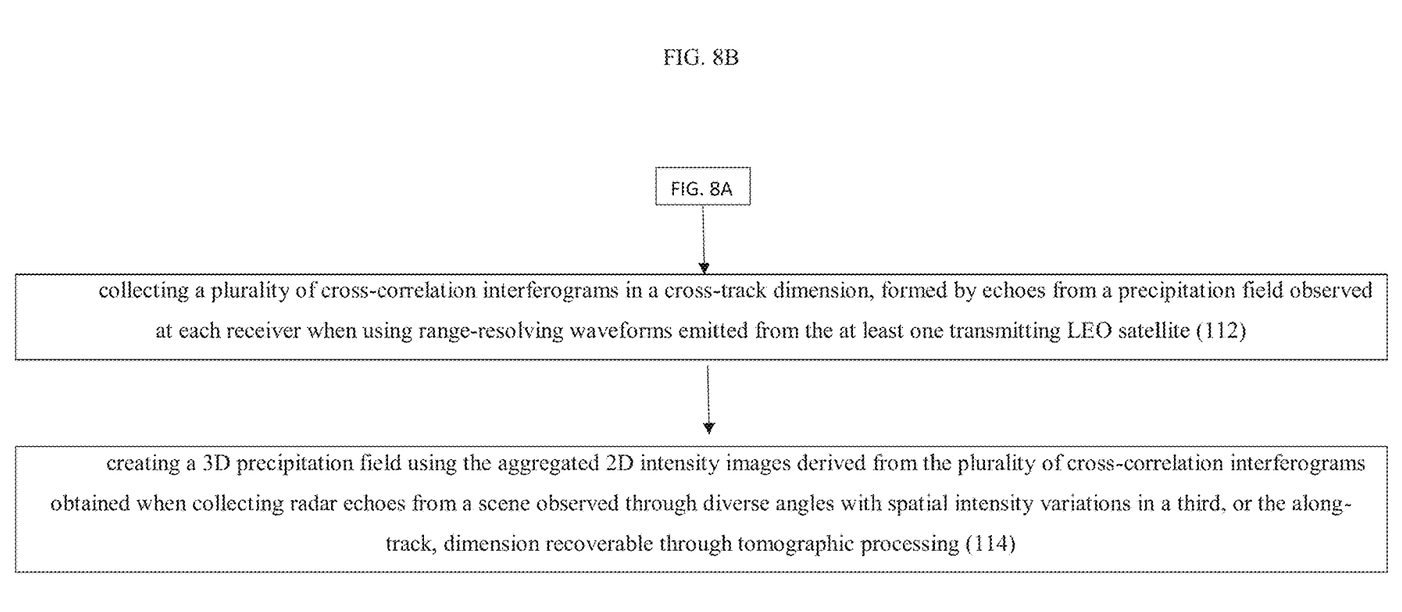

Referring to FIG. 8B, the flow chart of one embodiment of a method according to the principles of the present disclosure is continued. More specifically, a plurality of cross-correlation interferograms are collected in a cross-track dimension, formed by echoes from a precipitation field observed at each receiver when using range-resolving waveforms emitted from the at least one transmitting low earth orbit satellite (112). A three-dimensional precipitation field is then created using the aggregated two-dimensional intensity images derived from the plurality of cross-correlation interferograms obtained when collecting radar echoes from a scene observed through diverse angles with spatial intensity variations in a third, or the along-track, dimension recoverable through tomographic processing (114). The fine-scale 3D reflectivity field of the precipitation field is the output product we desire. For weather research, this characterization of the storm can be used by researchers in the field to improve the basic understanding of how such storms behave. This knowledge would enable improved storm forecasting and improved understanding of storm impacts.

The overall 3D imaging process for the precipitation field employs a sequence of processes, with latter processes informed by the results of earlier ones. The first step, employing the primarily down-ward looking transmitter and one receiver, obtains a measure of the back-scatter of the precipitation field in the (primarily) vertical axis, summed over the transmitter beam angle. The second step, employing the transmitter and two receivers in the interferometry process described earlier, and also employs the results of the first step to yield two-dimensional image of the backscatter field, (providing spatial contrast in vertical and cross-track directions, but not yet in the along-track direction). The first two of these processes are repeated at a series of angles, collecting 2D images at each angle. In the third, or tomographic step, the set of 2D projection images, taken at different angles, are transformed into the 3D image of the back-scatter from the precipitation field.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A synthetic aperture RADAR method comprising,
   providing at least one transmitting low earth orbit satellite;
   providing at least two receiving low earth orbit satellites;
   remotely coupling the at least one transmitting low earth orbit satellite with the at least two receiving low earth orbit satellites;
   flying the at least one transmitting low earth orbit satellite and the at least two receiving low earth orbit satellites in formation;
   synchronizing a timing of the at least one transmitting low earth orbit satellite and the at least two receiving low earth orbit satellites;
   collecting and resolving a plurality of two-dimensional intensity images via the at least two receiving low earth orbit satellites in an along-track dimension;
   operating the at least two receiving low earth orbit satellites in a spotlight synthetic aperture RADAR mode;
   aggregating the plurality of two-dimensional intensity images to increase a signal to noise;
   collecting a plurality of cross-correlation interferograms in a cross-track dimension, formed by echoes from a precipitation field observed at each receiver when using range-resolving waveforms emitted from the at least one transmitting low earth orbit satellite; and
   creating a three-dimensional precipitation field using the aggregated two-dimensional intensity images derived from the plurality of cross-correlation interferograms obtained when collecting radar echoes from a scene observed through diverse angles with spatial intensity variations in a third, or the along-track, dimension recoverable through tomographic processing.

2. The method according to claim 1, wherein the satellites are microsatellites, capable of agile, coordinated beam-steering.

3. The method according to claim 1, wherein the satellites are operating in X-Band, Ku-band or other RF bands with suitable radar cross-section for precipitation.

4. The method according to claim 1, wherein mapping of the precipitation field reflectivity has a horizontal resolution of about 1 km and a vertical resolution of about 125 m.

5. The method according to claim 1, wherein spotlight mode comprises a series of coherently linked echoes collected while lines-of-sight of the at least one transmitter and the at least two receivers rotates around a target area during which period the precipitation field is effectively stationary.

6. The method according to claim 1, wherein one of the at least two receiving low earth satellites or the at least one transmitting low earth satellites is a master and the remaining at least two receiving low earth satellites or the at least one transmitting low earth satellites are slaves.

7. The method according to claim 1, wherein the synchronization is within 5 ns at Ka band, and within a comparable number of RF waveform periods at other RF frequencies suitable for this application.

* * * * *